Aug. 24, 1926.
L. RODENHAUSEN
1,597,544
DUMPING WAGON
Filed August 4, 1923  3 Sheets-Sheet 1
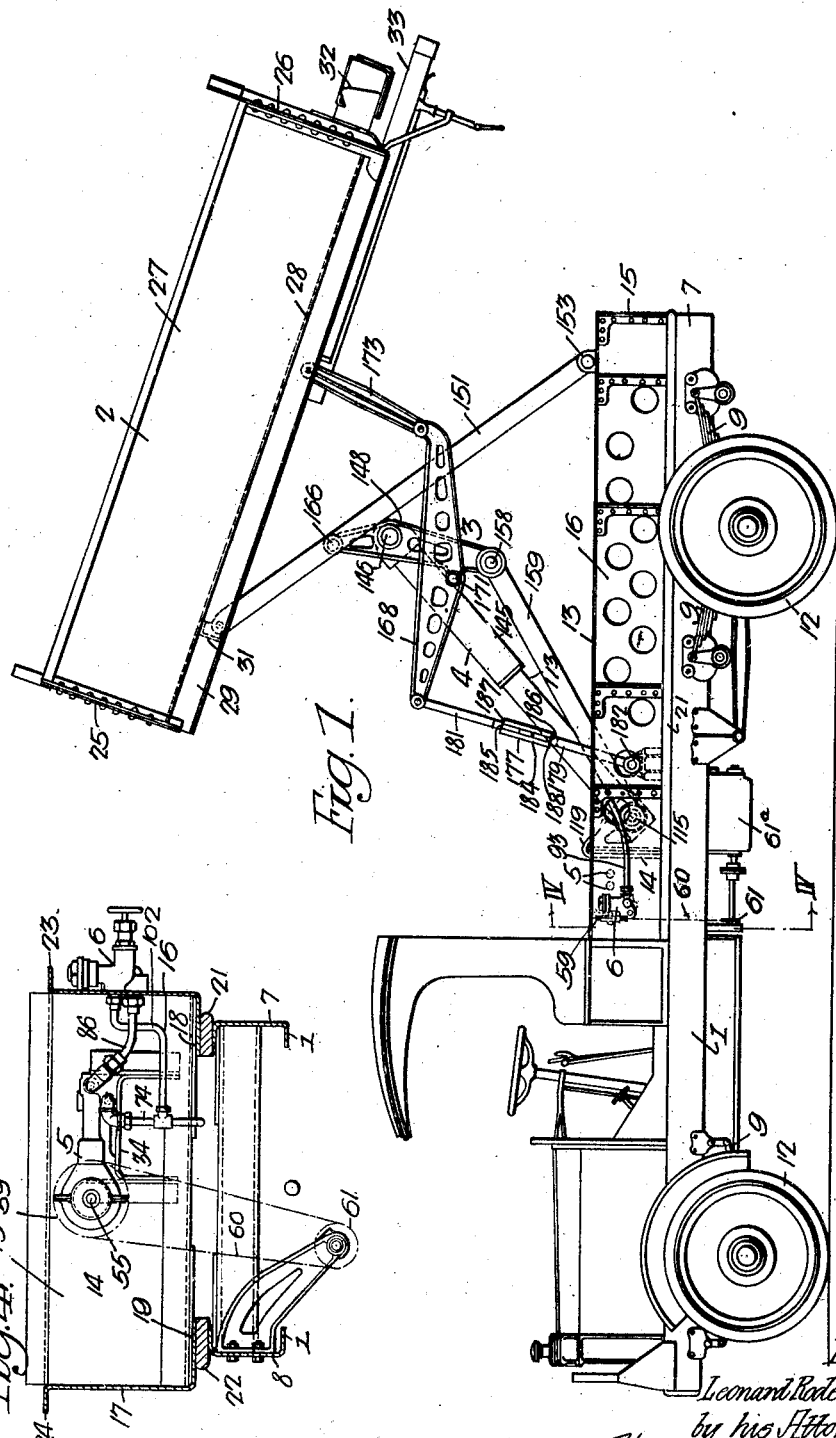

Aug. 24, 1926.
L. RODENHAUSEN
1,597,544
DUMPING WAGON
Filed August 4, 1923  3 Sheets-Sheet 2
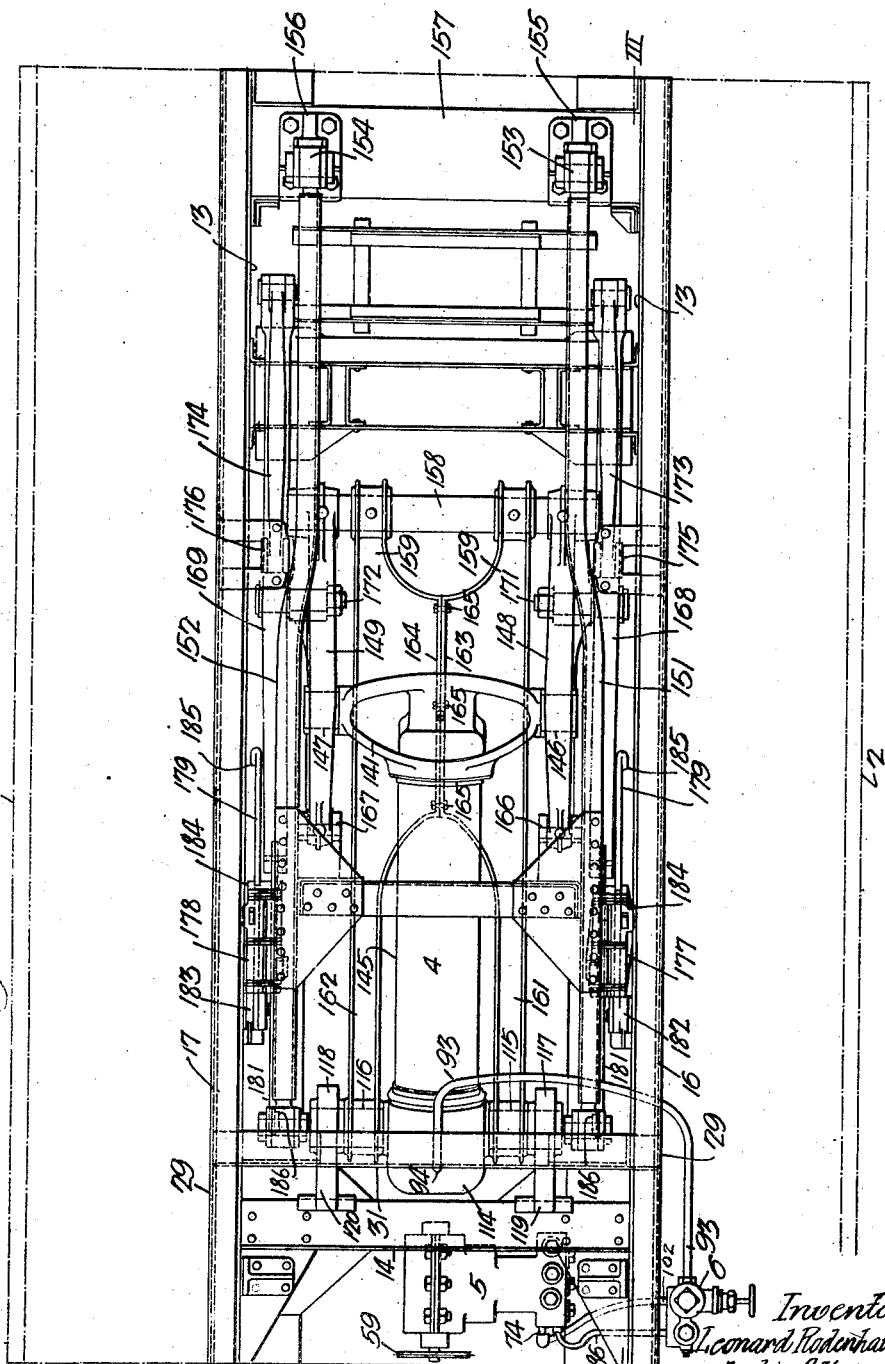

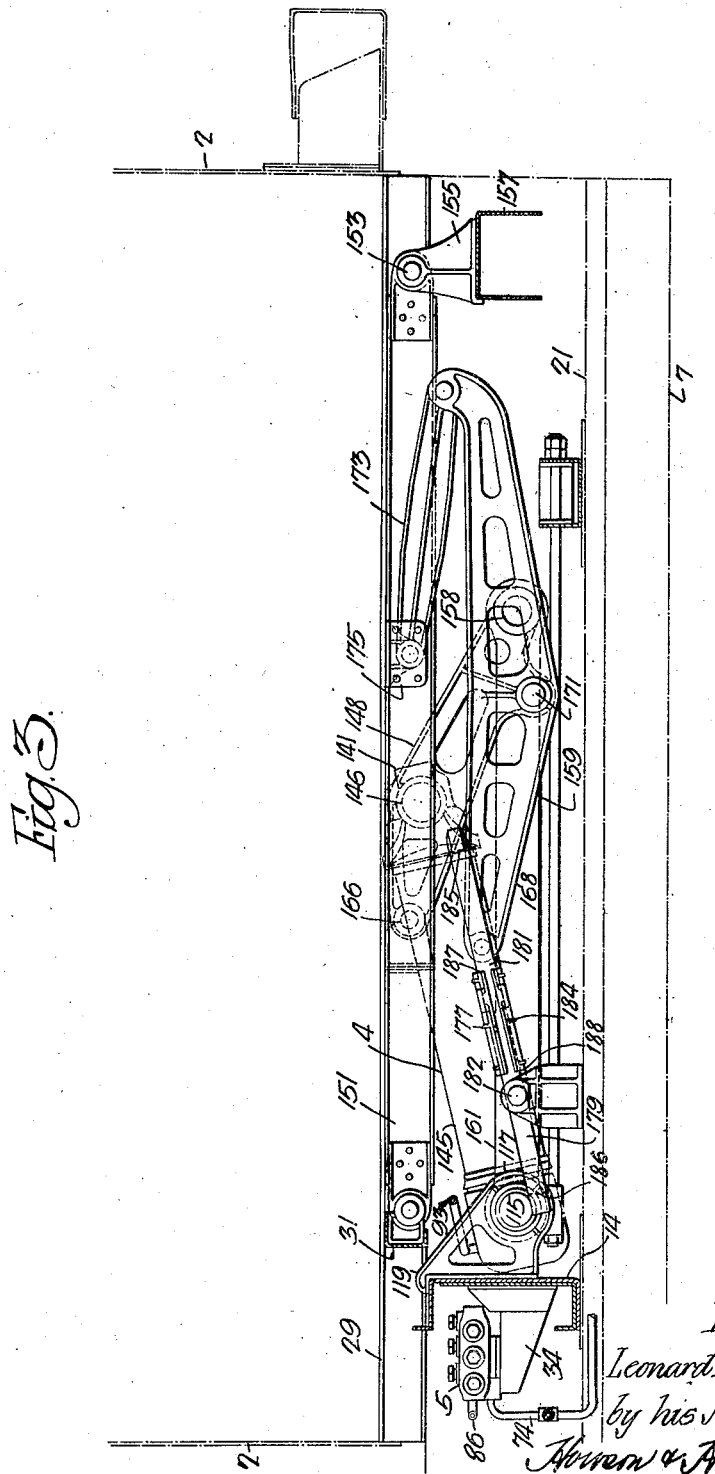

Patented Aug. 24, 1926.

1,597,544

UNITED STATES PATENT OFFICE.

LEONARD RODENHAUSEN, OF PHILADELPHIA, PENNSYLVANIA.

DUMPING WAGON.

Application filed August 4, 1923. Serial No. 655,581.

My invention relates to dumping vehicles, having particular relation to the mechanism for tilting and raising the body portions thereof.

In its broadest aspect, an important object of my invention is to provide a dumping wagon having an automatic hoisting apparatus for tilting and raising the body portion of the wagon, which is characterized by the extremely high lift and decided pitch of the body portion; by the absence of racks, pinions and rollers and the consequent side motion of the elevated body when the wagon is discharging from an inclined position; and by the elimination of jar and noise in the raising and lowering of the body.

A more specific object of my invention is to provide a dumping wagon construction comprising a body, a supporting structure therefor and a link mechanism having a ram effective upon the operation of the latter to raise the forward end of the body and subsequently the rear end thereof.

With these and other objects and applications in view, my invention further consists in the nature, the mode of operation and the details of construction and arrangement hereinafter described and claimed and illustrated in the accompanying drawings, wherein—

Fig. 1 is a side elevational view of the assembled motor driven dumping wagon embodying my invention, wherein the body portion thereof is shown raised to its fullest height;

Fig. 2 is a detail top plan view of the structure of Fig. 1, with the body removed showing the link mechanism in its collapsed position, as obtains when the body is resting upon the supporting structure;

Fig. 3 is a longitudinal sectional view taken on the line III—III of Fig. 2, showing, in addition, the movable body;

Fig. 4 is a detail transverse sectional view of the chassis structure shown in Fig. 1, the section plane being indicated by the line IV—IV thereof;

In the illustrated embodiment of my invention shown in the drawing, I provide a chassis structure 1, which is adapted to serve as a support for a body 2 and for a link mechanism 3 including a ram 4 of the hydraulic type, the link mechanism being operative, upon the operation of the ram 4, to tilt and then raise the body member 2 from the chassis structure 1. The actuating fluid medium for the ram 4 may be supplied by a pressure pump 5 through a control valve 6.

The chassis structure 1, of which Figs. 1 and 4 are illustrative, comprises a pair of channel members 7 and 8 constituting the main supporting side frames therefor. The side frames 7 and 8 may be flexibly supported by springs 9 upon wheels 12, as is customary in the chassis construction of the prior art. A chassis superstructure 13, comprising vertically positioned front, rear and side wall portions 14, 15, 16 and 17, and inwardly extending side wall flanges 18 and 19, is positioned with the latter resting upon side sills 21 and 22, respectively, which are supported upon the flange portions of the channels 7 and 8. The upper edges of the side members 16 and 17 of the superstructure 13 are provided with outwardly extending side flanges 23 and 24, which serve as supporting shoulders for the movable body 2 when the latter is in its lowered position.

The body construction 2 comprises front, rear and side wall portions 25, 26 and 27, respectively, and a base portion 28. A pair of side sills 29, which are positioned on the lower side of the base portion 28 and which serve to render the body construction more rigid, rest upon the chassis superstructure flanges 23 and 24 when the body is lowered. A transverse bracing member 31, extending between the side sills 29, is positioned near the front end 25 of the body 2. The rear end 26 of the body 2 may be provided with an outlet opening 32 and an adjustable extension 33 therefor, the latter being carried on the under side thereof.

The pump 5 is supported by a bracket 34 extending from the front end 14 of the chassis super-structure 13. As illustrated the pump is of the reciprocating piston type, but inasmuch as the pump itself does not constitute a part of the present invention the details thereof are not shown. The pump is provided with a crank shaft 55, the projecting end of which carries a sprocket wheel 59. This is connected by means of a chain 60 with a driving sprocket wheel 61 which may be driven by the main motor of the vehicle through a special transmission mechanism 61$^a$. The pump is provided with an inlet pipe 74 which communicates with a reservoir (not shown) containing a fluid medium as for instance oil.

The pump also has a discharge pipe 86 which extends to the beforementioned control valve 6. The control valve 6, which may be secured, for ease of access, to the outer side of the side wall 16, communicates by means of a pipe 93 with a pressure inlet opening 94 in the lower end portion of the ram 4. The ram 4 comprises a ram cylinder 113 having a cap 114 secured thereto, the cap 114 being provided with trunnions 115 and 116 mounted in bearings 117 and 118 which are carried by bracket members 119 and 120, respectively, having base portions rigidly secured to the front wall 14 of the chassis superstructure 13.

The outer end of the movable ram element may be closed by means of a cap member 141 which is secured thereto. Protection for the ram may be afforded by a cylindrical casing 145, which completely covers the ram cylinder 113, when the body 2 is lowered, the dust casing 145 being secured to the cap member 141. The cap member 141 is further provided with trunnions 146 and 147 which are journaled in bearings provided in levers 148 and 149 of the link-mechanism 3. The link-mechanism 3, which is effective upon the extension of the ram 4 to tilt and subsequently to raise the body 2, from the chassis superstructure 13 comprises a pair of arms 151 and 152, which have their corresponding lower ends pivotally mounted on bearings 153 and 154 carried by bracket members 155 and 156, supported on a common supporting member 157 extending between the rear end portions of the side walls 16 and 17. The corresponding upper ends of the arms 151 and 152 are pivotally mounted on bearings carried by the cross-brace 31, which is rigidly secured to the forward end portion of the body 2.

The levers 148 and 149, which pivotally carry the movable element 123 of the ram 4 intermediate the ends thereof, are pivotally mounted at the lower ends thereof on a bearing pin 158 which is journaled in bearings provided in the upper bifurcated end portion of a link 159 having lower bifurcated end portions 161 and 162 journaled on the trunnion pins 115, and 116, respectively, of the ram construction 4. The link 159 may be constructed of a single forging or of two forgings having coöperating flange portions 163 and 164 rigidly secured in position by bolt members 165. The upper ends of the levers 148 and 149 are mounted on pivot pins 166 and 167 extending from the upper end portions of the arms 151 and 152, respectively. The lengths of the several levers constituting the link-mechanism 3, are such that when the body 2 is positioned on the chassis superstructure 13, the levers fold within the space defined by the walls 14, 15, 16 and 17 of said chassis superstructure, as shown in Fig. 2 of the drawing. When a fluid medium under pressure is supplied to the ram 4 and the latter is extended, the operation of the link-mechanism, just described, is to effect the raising or tilting of the forward end portion of the body 2. It will be observed that, when the link mechanism is in its lower or folded position, the arms 151 and 152 and the link 159 extend in opposite directions and in lapped relationship from the respective ends of the levers 168 and 169 to the respective pivotal connections with the superstructure 13. The levers 168 and 169 are preferably inclined, as shown in Fig. 2, and the arms 151 and 152 are preferably at a higher level than the link 159.

The link-mechanism 3 includes additional apparatus for raising the rear end portion of the body 2 comprising levers 168 and 169 which are pivotally mounted at points substantially midway between the ends thereof on pivot pins 171 and 172, extending from points on the levers 148 and 149 respectively, just above the lower pivotal supports thereof. Struts 173 and 174 have their opposite ends pivotally mounted on the corresponding ends of the levers 168 and 169 and on pivot pins carried by bracket members 175 and 176, respectively, the latter being secured to the body side sills 29. The remaining ends of the levers 168 and 169 are associated with the superstructure 13 by means of telescoping link structures 177 and 178, respectively. Each telescoping structure comprises links 179 and 181 which have their opposite ends pivotally mounted on the end portions of the levers 168 and 169 and on bearings carried by bracket members 182 and 183, respectively, secured to the side wall portions 16 and 17 of the chassis superstructure 13. The adjacent end portions of the links 179 and 181 of the telescopic structures are slidably mounted in so-called "slide-bar boxes" 184, and are provided with shoulder portions 185 and 186 adapted to engage corresponding projecting portions 187 and 188, respectively, on the slide-bar box 184, when the links have been extended by the raising or tilting of the body 2, as shown particularly in Fig. 1. When the body 2 is resting upon the chassis superstructure 13, the link-mechanism just described assumes the general position indicated in Fig. 2 of the drawing.

In operation, as the ram 4 is extended, the forward end of the body 2 is tilted upwardly with the result that the levers 168 and 169 and the lifting struts 173 and 174 remain in the general parallel relation with the body 2, shown in Figs. 2 and 3. The links 179 and 181 of the telescoping structures 177 and 178, however, are extended until they have reached the limit of their travel defined by the steps 187 and 188, respectively, whereupon, the motion of the upper ends of the levers 168 and 169 is arrested. A further extension of the ram 4 now causes the levers 168 and 169 and the struts 173 and 174 to effect the raising of the rear end portion of the body 2, the latter assuming, in its most extended position, that shown in Fig. 1 of the drawing.

While I have described a specific embodiment of my invention in detail and while I have pointed out certain of the most obvious principles and purposes and details of construction thereof, I do not intend that the language employed in the following claims shall be limited to the precise features described, but I intend that the claims shall be construed to cover all combinations which are fairly included in the language thereof when read in connection with the prior art, regardless of the details and functions mentioned in the description or illustrated in the drawing.

I claim:

1. In a lever mechanism for the purpose described, the combination with a supporting structure, of an arm and a link respectively having widely separated parallel horizontal pivotal rear and front connections with the said structure; a floating lever having pivotal connections at its ends respectively with the said arm and the said link between the first said pivotal connections, the last said connections normally being horizontally spaced and the said arm and link normally extending approximately horizontally in lapped relationship with each other and in opposite directions from the last said and in opposite directions from the last said pivotal connections to the first said pivotal connections; and means engaging the said lever between its ends to apply force thereto in an upward and rearward direction throughout its entire path to move it upward and rearward and thereby move the arm and the link upward about the first said pivotal connections to oppositely inclined positions.

2. In a lever mechanism for the purpose described, the combination with a supporting structure, of an arm and a link respectively having widely separated parallel horizontal pivotal rear and front connections with the said structure with the pivotal connection for the arm at a higher level than for the link; a normally inclined floating lever having a pivotal connection at its upper end with the said arm and at its lower end with the said link between the first said pivotal connections, the said arm and link normally extending approximately horizontally in lapped relationship with each other and in opposite directions from the last said pivotal connections to the first said pivotal connections; and means engaging the said lever between its ends to apply force thereto in a rearward and upward direction throughout its entire path to move it rearward and upward and thereby move the arms and the link upward about the first said pivotal connections to oppositely inclined positions.

3. In a lever mechanism for the purpose described, the combination with a supporting structure, of an arm and a link respectively having widely separated parallel horizontal pivotal rear and front connections with the said structure with the pivotal connection for the arm at a higher level than that for the link; a normally inclined floating lever having a pivotal connection at its upper end with the said arm and at its lower end with the said link between the first said pivotal connections, the said arm and link normally extending approximately horizontally in lapped relationship with each other and in opposite directions from the last said pivotal connections to the first said pivotal connections; and a ram supported at one end on the supporting structure and engaging the said lever between its ends to apply force thereto in a rearward and upward direction throughout its entire path to move it rearward and upward and thereby move the arms and the link upward about the first said pivotal connections to oppositely inclined positions.

4. The combination with a supporting structure; of a link having one end thereof pivotally mounted thereon; a ram having one end pivotally mounted about the same axis as said link; a lever fulcrumed on the remaining end of said link said ram pivotally engaging said lever at a point intermediate the ends thereof; and an arm fulcrumed on said supporting structure, the free end of the said arm engaging a mechanism to be moved and the free end of the said lever pivotally engaging the said arm at a point intermediate the ends thereof.

5. In a lever mechanism for the purpose described, the combination with a supporting structure, of an arm and a link respectively having widely separated parallel horizontal pivotal connections with the said structure with the pivotal connection for the arm at a higher level than that for the link; a normally inclined floating lever having a pivotal connection at its upper end with the said arm and at its lower end with the said link between the first said pivotal connections, the said arm and link normally extending approximately horizontally in lapped relationship with each other and in opposite directions from the last said pivotal connections to the first said pivotal connections; and a ram supported at one end on the supporting structure for movement about an axis coincident with the pivotal axis of the link, the said ram engaging the said lever between its ends to move it and thereby move the arm and the link upward about the first said pivotal connections to oppositely inclined positions.

6. In a lever mechanism for the purpose described, the combination with a supporting structure, of two spaced connected arms and a link located between the arms and provided with a central recess, the said arms and the said link having widely separated horizontal pivotal connections with the supporting structure; two similar floating levers each having a pivotal connection at its upper end with one of the arms and at its lower end with the said link, the said arms and the said link normally extending approximately horizontally in lapped relationship with each other and in opposite directions from the last said pivotal connections to the first said pivotal connections; a ram located in the recess in the link and comprising inner and outer members; trunnions on one member engaging the supporting structure, the said trunnions being coaxial with the pivotal connection between the link and the supporting structure; and trunnions on the other member engaging the said levers.

7. In a lever mechanism for tilting and elevating a body structure, the combination with the body structure and a supporting structure, of an arm and a link respectively having widely separated parallel horizontal pivotal connections with the said supporting structure, the said arm also being pivotally connected to the body structure; a floating lever having pivotal connections at its ends respectively with the said arm and the said link between the first said pivotal connections, the said arm and link normally extending approximately horizontally in opposite directions from the last said pivotal connections to the first said pivotal connections; means engaging the said lever between its ends to move it and thereby move the arm and the link upward about the first said pivotal connections to oppositely inclined positions, and means for raising the said body structure about the axis of its pivotal connection with the said arm.

8. In a lever mechanism for tilting and elevating a body structure, the combination with the body structure and a supporting structure, of an arm and a link respectively having widely separated parallel horizontal pivotal connections with the said supporting structure, the said arm also being pivotally connected to the body structure; a floating lever having pivotal connections at its ends respectively with the said arm and the said link between the first said pivotal connections, the said arm and link normally extending approximately horizontally in opposite directions from the last said pivotal connections to the first said pivotal connections; means engaging the said lever between its ends to move it and thereby move the arm and the link upward about the first said pivotal connections to oppositely inclined positions; and means connected with and operable by the said lever for raising the said body structure about the axis of its pivotal connection with the said arm.

9. In a lever mechanism for tilting and elevating a body structure, the combination with the body structure and a supporting structure, of an arm and a link respectively having widely separated parallel horizontal pivotal connections with the said supporting structure, the said arm also being pivotally connected to the body structure; a floating lever having pivotal connections at its ends respectively with the said arm and the said link between the first pivotal connections, the said arm and link normally extending approximately horizontally in opposite directions from the last said pivotal connections to the first said pivotal connections; means engaging the said lever between its ends to move it and thereby move the arm and the link upward about the first said pivotal connections to oppositely inclined positions; and means for raising the said body structure about the axis of its pivotal connection with the said arm, the said means comprising a second lever pivoted between its ends to the first said lever, a strut extending from one end of the second lever to the body structure, and a link connecting the other end of the second lever with the supporting structure.

10. In a lever mechanism for tilting and elevating a body structure, the combination with the body structure and a supporting structure, of an arm and a link respectively having widely separated parallel horizontal pivotal connections with the said supporting structure, the said arm also being pivotally connected to the body structure; a floating lever having pivotal connections at its ends respectively with the said arm and the said link between the first said pivotal connections, the said arm and link normally extending approximately horizontally in opposite directions from the last said pivotal connections to the first said pivotal connections; means engaging the said lever between its ends to move it and thereby move the arm and the link upward about the first said pivotal connections to oppositely inclined positions; and means for raising the said body structure about the axis of its pivotal connection with the said arm, the said means comprising a second lever pivoted between its ends to the first said lever, a strut extending from one end of the second lever to the body structure, and a telescopic link connecting the other end of the second lever with the supporting structure.

11. In combination, a supporting structure; a body to be raised therefrom; a link having one end thereof pivotally mounted at one end of said supporting structure; a ram having one end pivotally mounted about the same axis as said link; a lever fulcrumed on the remaining end of said link, said ram pivotally engaging said lever at a point intermediate the ends thereof; an arm fulcrumed at the remaining end of said supporting structure, the free end of the said arm pivotally engaging the end of the body to be raised and the free end of the said lever pivotally engaging the said arm at a point intermediate the ends thereof; and means for raising the other end of said body.

12. In combination, a supporting structure; a body to be raised; a link having one end thereof pivotally mounted at one end of said supporting structure; a ram having one end pivotally mounted about the same axis as said link; a lever fulcrumed on the remaining end of said link, said ram pivotally engaging said lever at a point intermediate the ends thereof; an arm fulcrumed at the remaining end of said supporting structure, the free end of the said arm pivotally engaging the end of the body to be raised and the free end of the said lever pivotally engaging the said arm at a point intermediate the ends thereof; and lever mechanism effective during the operation of the ram to raise the other end of said body.

13. In combination, a supporting structure; a body to be raised; a link having one end thereof pivotally mounted at one end of said supporting structure; a ram having one end pivotally mounted about the same axis as said link; a lever fulcrumed on the remaining end of said link, said ram pivotally engaging said lever at a point intermediate the ends thereof; an arm fulcrumed at the remaining end of said supporting structure, the free end of the said arm pivotally engaging the end of the body to be raised, and the free end of the said lever pivotally engaging the said arm at a point intermediate the ends thereof; and lever mechanism effective during the operation of the ram to raise the other end of said body, said mechanism comprising a second lever pivotally mounted intermediate its ends at a point on said first-mentioned lever; a strut operatively associating one end of said second lever and said body; and a telescopic link having its opposite ends pivotally mounted on said supporting structure and on the remaining end of said second lever.

14. In combination; a supporting structure having front and rear end portions; a link having one end thereof pivotally mounted at the front end thereof; a ram also pivotally mounted at said front end; a lever fulcrumed at the remaining end of said link, said ram pivotally engaging said lever at a point intermediate the ends thereof; an arm fulcrumed at the rear end of said supporting structure; a body to be raised having front and rear end portions, the free end of the said arm pivotally engaging the front end of said body and the free end of said lever pivotally engaging the said arm at a point intermediate the ends thereof, whereby the front end of said body may be raised upon the operation of said ram; and means for raising the rear end of said body upon the operation of said ram comprising a second lever pivotally mounted intermediate its ends at a point on said first-mentioned lever intermediate its ends; a strut operatively associating one end of said second lever and said body; and a telescopic link having its opposite ends pivotally mounted on said supporting structure and on the remaining end of said second lever.

LEONARD RODENHAUSEN.